US009359917B2

(12) United States Patent
Koseoglu et al.

(10) Patent No.: US 9,359,917 B2
(45) Date of Patent: Jun. 7, 2016

(54) GASIFICATION OF HEAVY RESIDUE WITH SOLID CATALYST FROM SLURRY HYDROCRACKING PROCESS

(71) Applicant: Saudi Arabian Oil Company, Dhahran (SA)

(72) Inventors: Omer Refa Koseoglu, Dhahran (SA); Jean-Pierre Ballaguet, Thenisy (FR)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/740,040

(22) Filed: Jun. 15, 2015

(65) Prior Publication Data

US 2015/0275700 A1    Oct. 1, 2015

Related U.S. Application Data

(63) Continuation of application No. 13/236,923, filed on Sep. 20, 2011, now Pat. No. 9,056,771.

(51) Int. Cl.
| | |
|---|---|
| *C10G 67/12* | (2006.01) |
| *C10G 47/00* | (2006.01) |
| *C10G 65/00* | (2006.01) |
| *F01K 23/06* | (2006.01) |
| *C10G 65/14* | (2006.01) |
| *C01B 3/36* | (2006.01) |
| *C10G 47/26* | (2006.01) |
| *C10G 47/06* | (2006.01) |
| *C10G 47/14* | (2006.01) |
| *C10G 47/10* | (2006.01) |
| *C10J 3/46* | (2006.01) |
| *C10J 3/82* | (2006.01) |

(52) U.S. Cl.
CPC ............... *F01K 23/067* (2013.01); *C01B 3/36* (2013.01); *C10G 47/06* (2013.01); *C10G 47/10* (2013.01); *C10G 47/14* (2013.01); *C10G 47/26* (2013.01); *C10G 65/14* (2013.01); *C10G 67/12* (2013.01); *C10J 3/466* (2013.01); *C10J 3/82* (2013.01); *C01B 2203/0255* (2013.01); *C01B 2203/0283* (2013.01); *C01B 2203/063* (2013.01); *C10J 2300/0946* (2013.01); *C10J 2300/0959* (2013.01); *C10J 2300/0976* (2013.01); *C10J 2300/1675* (2013.01); *C10J 2300/1846* (2013.01); *Y02P 20/145* (2015.11)

(58) Field of Classification Search
CPC ..... C10G 1/002; C01B 3/32; C01B 2203/025; C01B 2203/065; C01B 2203/1247
USPC ........................................................ 48/197 R
See application file for complete search history.

(56) References Cited

U.S. PATENT DOCUMENTS

| | | | | |
|---|---|---|---|---|
| 3,380,910 | A * | 4/1968 | Griffiths ................... | C01B 3/22 208/209 |
| 4,192,735 | A * | 3/1980 | Aldridge ................ | C10G 47/26 208/108 |
| 4,226,742 | A * | 10/1980 | Bearden, Jr. ............ | B01J 23/28 208/216 R |
| 4,548,700 | A * | 10/1985 | Bearden, Jr. ........... | C10G 1/086 208/108 |
| 5,935,419 | A * | 8/1999 | Khan ..................... | C10G 47/26 208/108 |
| 2005/0241993 | A1 * | 11/2005 | Lott ....................... | B01J 27/047 208/108 |
| 2010/0298449 | A1 * | 11/2010 | Rojey ...................... | C01B 3/34 518/700 |

* cited by examiner

*Primary Examiner* — Matthew Merkling
(74) *Attorney, Agent, or Firm* — Abelman, Frayne & Schwab

(57) ABSTRACT

A cost-effective solution for the disposal of heavy residue bottoms recovered from a slurry hydrocracking process that include solid heterogeneous catalyst particles is provided by their introduction into a membrane wall gasification reactor in the form of a flowable slurry to produce a synthesis gas and, optionally, subjecting the synthesis gas to a water-gas shift reaction to produce a more hydrogen-rich product stream. Process steam and electricity are produced by recovering the sensible heat values from the hot synthesis gas.

17 Claims, 1 Drawing Sheet

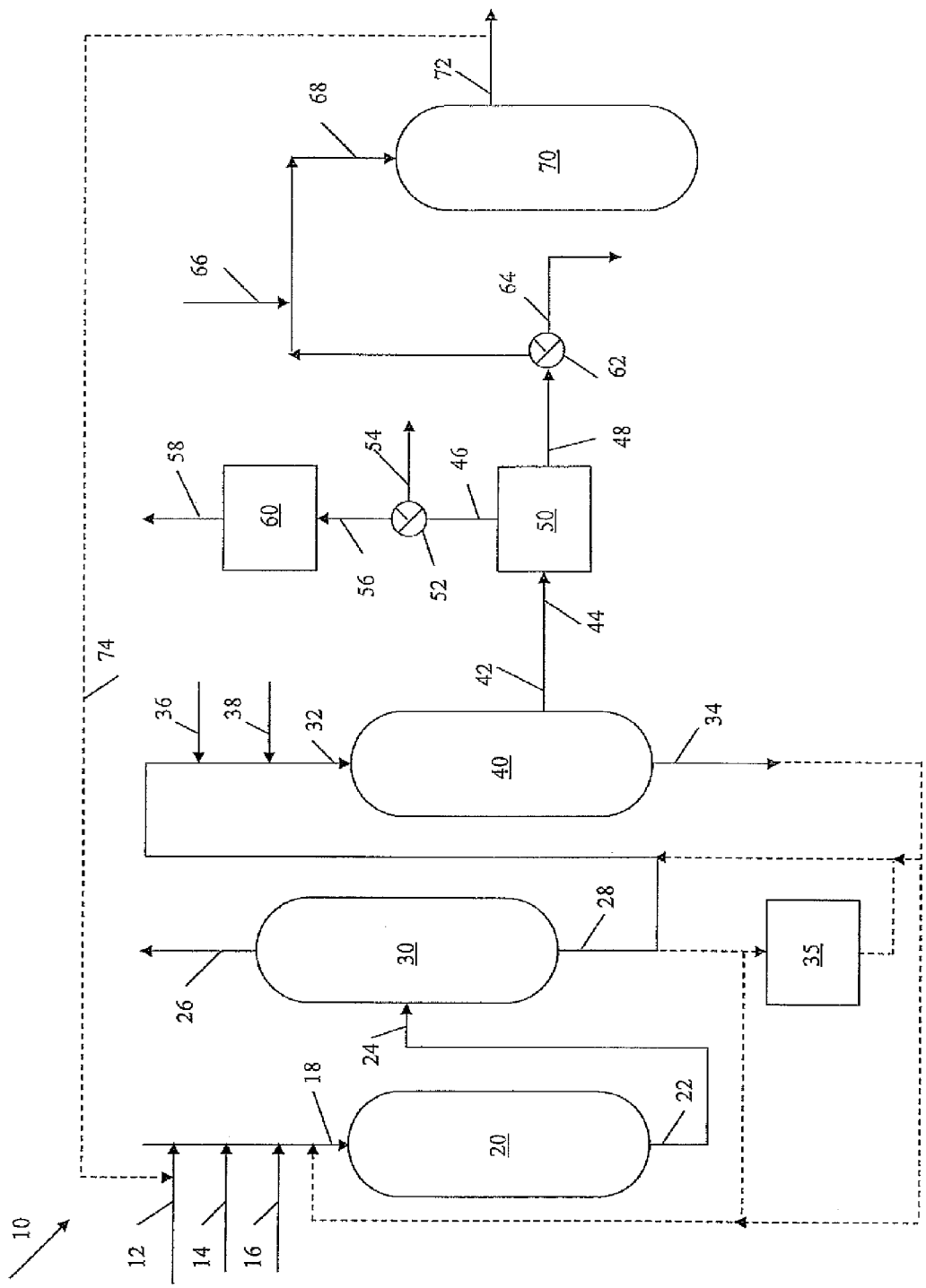

GASIFICATION OF HEAVY RESIDUE WITH SOLID CATALYST FROM SLURRY HYDROCRACKING PROCESS

RELATED APPLICATION

This application is a continuation of allowed U.S. Ser. No. 13/236,923 filed on Sep. 20, 2011, the benefit of the priority of which is claimed, and the disclosure of which is incorporated herein by reference.

BACKGROUND OF THE INVENTION

1. Field of the Invention

The present invention relates to processes for the partial oxidation in a membrane wall gasification reactor of heavy residue bottoms recovered from a slurry hydrocracking process to produce a synthesis gas.

2. Description of Related Art

In a typical refinery, crude oil is initially introduced to an atmospheric distillation column or a crude tower where it is separated into a variety of different components including naphtha boiling in the range 36° C. to 180° C., diesel boiling in the range 180° C. to 370° C., and atmospheric bottoms boiling above 370° C. The atmospheric bottoms residue is further processed in a vacuum distillation column where it is separated into a vacuum gas oil (VGO) boiling in the range 370° C. to 520° C. and a heavy vacuum residue boiling above 520° C. The VGO may be further processed by hydrocracking to produce naphtha and diesel, or by fluid catalytic cracking (FCC) to produce gasoline and cycle oils. The heavy vacuum residue can be treated to remove unwanted impurities or converted into useful hydrocarbon products.

There are three principal types of reactors used in the refining industry: fixed bed, ebullated bed and moving bed. In a fixed bed reactor, catalyst pellets are held in place and do not move with respect to a fixed reference frame. Fixed-bed technologies have considerable problems in treating particularly heavy charges containing high percentages of heteroatoms, metals, and asphaltenes, as these contaminants cause the rapid deactivation of the catalyst and subsequent plugging of the reactor. Multiple fixed-bed reactors connected in series can be used to achieve a relatively high conversion of heavy feedstocks boiling above 370° C., but such design would be costly and, for certain feedstocks, commercially impractical, e.g., catalysts must be replaced every 3 to 4 months.

The ebullated bed reactor was developed to overcome the plugging problems associated with fixed bed reactors as the feedstock becomes heavier and the conversion of vacuum residue increases. In an ebullated bed reactor, the catalyst is fluid, meaning that it will not plug-up as is possible in a fixed bed reactor. The fluid nature of the catalyst also allows for on-line catalyst replacement of a small portion of the bed which results in a high net bed activity.

The moving bed reactor combines the advantage of plug flow in a fixed bed operation and the relatively easy catalyst replacement of an ebullated bed technology. The trickle-flow system allows discontinuous catalyst replacement without interrupting the operation. Operating conditions are more severe than for a usual fixed bed reactor, i.e., the pressure can exceed 200 atmospheres, and the temperature can be in the range of between 400° C. to 427° C. The frequency of catalyst replacement depends on the rate of deactivation. During replacement, catalyst movement is slow compared with the linear velocity of the feed. Catalyst addition and withdrawal are performed via a sluice system at the top and bottom of the reactor. The advantage of the moving bed reactor is that the top layer of the moving bed consists of fresh catalyst. Thus, metals and salts deposited on the top of the bed move downwards with the catalyst and are released at the bottom. The tolerance to metals and other contaminants is therefore much greater than in a fixed bed reactor. With this capability, the moving bed reactor has advantages for hydroprocessing of very heavy feeds, especially when several reactors are combined in series.

The decision to use a particular type of reactor is based on a number of criteria including the type of feedstock, desired conversion percentage, flexibility, run length, product quality, and others. In a refinery, the down-time for replacement or renewal of catalyst must be as short as possible. Further, the economics of the process will generally depend upon the versatility of the system to handle feed streams containing varying amounts of contaminants such as sulfur, nitrogen, metals and/or organometallic compounds, such as those found in VGO, DAO and residues.

Studies have been conducted related to converting heavy vacuum residues boiling at 520° C. and above into light hydrocarbons such as naphtha and diesel. A slurry hydrocracking process that converts heavy vacuum residues in the presence of hydrogen and solid catalyst particles or soluble catalysts has been reported by Zhang et al., "A Review of Slurry-Phase Hydrocracking Heavy Oil Technology", in *Energy & Fuels,* 2007, 21 (6), 3057-3062. The slurry hydrocracking technology is based on thermocracking. The process differs from the conventional thermocracking processes since it mixes the feed oil, hydrogen and dispersed unsupported catalysts particles together. It appears that the hydrogen is consumed principally to cap free radicals formed by thermocracking. See Matsumura et al., "Hydrocracking Marlim Vacuum Residue With Natural Limonite. Part 2: Experimental Cracking In A Slurry-Type Continuous Reactor", *Fuel,* 2005, 84, 417-421, 420. Heavy residue oil, VGO and low-value refractory pitch streams that normally cannot be economically upgraded or even blended into other products such as fuel oil or synthetic crude oil due to their high viscosity and solids content can be processed by slurry hydrocracking technology.

A slurry hydrocracking process is disclosed in U.S. Pat. No. 5,755,955 in which a heavy hydrocarbon feedstock is mixed with coke-inhibiting additive particles to form a slurry and passed upwardly through a confined vertical hydrocracking zone in the presence of hydrogen and in the absence of an active hydrogenation catalyst. A mixed effluent containing a gaseous phase comprising hydrogen and vaporous hydrocarbons and a liquid phase comprising heavy hydrocarbons and particles of the coke-inhibiting additive is removed from the reactor and separated into gaseous and liquid phases. The liquid phase is fractionated to obtain a bottom stream of pitch containing additive particles and an aromatic heavy gas oil fraction. At least a portion of the pitch stream is recycled back to form part of the feed slurry to the hydrocracking zone. The disclosed process suppresses coke formation and improves yields by controlling the ratio of lower polarity aromatics-to-asphaltenes in the reactor.

The catalysts used in the slurry hydrocracking process can be in the form of powdered natural ore, powdered coal, one or more water-soluble or oil-soluble salts which can contain one or more metals selected from cobalt, molybdenum, nickel, iron, tungsten or manganese. A method for preparing a shiny hydrocracking catalyst is disclosed in U.S. Pat. No. 5,474,977 in which a heteropoly acid and a sulfide or a salt of a metal selected from Group IV through Group VIII are mixed with an asphaltene-containing hydrocarbon feedstock and heated to produce an organometallic compound. The organometallic compound is then converted in the presence of hydrogen to produce the slurry hydrocracking catalyst. Other catalysts suitable for use in the slurry hydrocracking process and methods for their manufacture are known in the art.

During the slurry hydrocracking process described above, the solid heterogeneous catalyst(s) must be recovered and/or removed after their catalytic activity falls below a predetermined efficacy, i.e., when the catalyst is deemed to be spent. One study suggests that the catalysts are single-use because they are deactivated by the high concentrations of sulfurous and nitrogenous compounds as well as the high molecular weight organometallic complexes. Supra, Zhang et al. at 3057. The spent solid catalyst can be contaminated with such compounds such as heavy polynuclear aromatic molecules, sulfur, nitrogen and/or metals. Disposal of the spent solid catalyst as a waste material incurs substantial expense and entails environmental considerations.

Gasification is well known in the art and it is practiced worldwide with application to solids and heavy liquid fossil fuels, including refinery bottoms. The gasification process uses partial oxidation to convert carbonaceous materials, such as coal, petroleum, biofuel, or biomass with oxygen at high temperature, i.e., greater than 800° C., into synthesis gas ("syngas"), steam and electricity. The synthesis gas consisting of carbon monoxide and hydrogen can be burned directly in internal combustion engines, or used in the manufacture of various chemicals, such as methanol via known synthesis processes and to make synthetic fuels via the Fischer-Tropsch process.

The major benefits for a refinery using a heavy residue gasification process are that it can provide a source of hydrogen for hydroprocessing to meet the demand for light hydrocarbon products; it produces electricity and steam for refinery use or for export and sale; it can take advantage of efficient power generation technology as compared to conventional technologies that combust the heavy residue; and it produces lower pollutant emissions as compared to conventional technologies that combust heavy residues as a means of their disposal. Furthermore, the gasification process provides a means for the local disposition of the heavy residues where they are produced, thus avoiding the costs for transportation off-site and/or storage; it also provides the potential for disposal of other refinery waste streams, including hazardous materials. Gasification also provides a potential carbon management tool, i.e., a carbon dioxide capture option can be employed if required by the local regulatory system.

Three principal types of gasifier technologies are moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and elevated temperatures that range from 1400° C. up to 1700° C. The refractory is subjected to the penetration of corrosive components from the generation of the synthesis gas and slag and thus subsequent reactions in which the reactants undergo significant volume changes that result in strength degradation of the refractory materials. The replacement of refractory linings can cost several millions of dollars a year and several weeks of downtime for a given reactor. Up until now, the solution has been the installation of a second or parallel gasifier to provide the necessary continuous operating capability, but the undesirable consequence of this duplication is a significant increase in the capital costs associated with the unit operation.

On the other hand, membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; an improved average on-stream time of 90%, as compared to an on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

In a membrane wall gasifier, the build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Further advantages include short start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed, and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use.

In both of these reactors, the flow of pressurized cooling water in the tubes is controlled to cool the refractory and ensure the downward flow of the molten slag. Both systems have demonstrated high utility with solid fuels, but not with liquid fuels.

For production of liquid fuels and petrochemicals, the key parameter is the mole ratio of hydrogen-to-carbon monoxide in the dry synthesis gas. This ratio is usually between 0.85:1 and 1.2:1, depending upon the feedstock characteristics. Thus, additional treatment of the synthesis gas is needed to increase this ratio up to 2:1 for Fischer-Tropsch applications or to convert carbon monoxide to hydrogen through the water-gas shift reaction represented by $CO+H_2O \rightarrow CO_2+H_2$. In some cases, part of the synthesis gas is burned together with some off gases in a combined cycle to produce electricity and steam. The overall efficiency of this process is between 44% and 48%.

While gasification processes are well developed and suitable for their intended purposes, its applications in conjunction with other refinery operations have been limited.

It is therefore an object of this invention to provide a process for the disposal of heavy residue bottoms recovered from a slurry hydrocracking process that is economically valuable and environmentally friendly, and that is capable of producing a synthesis gas and/or hydrogen that can be used as a feedstream for other processes in the same refinery.

SUMMARY OF THE INVENTION

The present invention comprehends the processing and disposal of a feedstream comprising the heavy residue bottoms recovered from a slurry hydrocracking process that include solid heterogeneous catalyst particles by the partial oxidation of the feed material in a membrane wall gasification reactor to produce a synthesis gas and/or hydrogen.

In accordance with an embodiment, the process for the gasification of the heavy residue bottoms that include solid heterogeneous catalyst particles includes the steps of:
a. introducing a heavy hydrocarbon feedstock into a slurry hydrocracking zone with a predetermined amount of hydrogen and solid heterogeneous catalyst particles based on the carbon content of the feedstock to produce a slurry hydrocracking zone effluent;
b. conveying the slurry hydrocracking zone effluent to a separation zone to separate the slurry hydrocracking zone effluent into converted products and heavy residue bottoms;
c. recovering the converted products;
d. preparing a flowable slurry of the heavy residue bottoms;
e. passing the slurry of heavy residue bottoms as a pressurized feed into a membrane wall gasification reactor with a predetermined amount of oxygen and steam based on the carbon content of the feed;
f. subjecting the heavy residue bottoms to partial oxidation to produce hydrogen, carbon monoxide and a slag material;
g. recovering the hydrogen and carbon monoxide from the reactor in the form of a hot raw synthesis gas;
h. passing the hot raw synthesis gas to a steam generating heat exchanger to cool the hot raw synthesis gas and produce steam;
i. recovering steam from the heat exchanger and introducing the steam into a turbine to produce electricity; and
j. recovering the cooled synthesis gas.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawing is included to provide illustration and a further understanding of the various aspects and embodiments. The drawing, together with the remainder of the specification, serves to explain principles and operations of the described and claimed aspects and embodiments.

BRIEF DESCRIPTION OF THE DRAWING

The foregoing summary, as well as the following detailed description will be best understood when read in conjunction with the attached drawing which is a schematic diagram of a process for the gasification of a feedstream comprising the heavy residue bottoms and a solid catalyst particles from a slurry hydrocracking process in accordance with the present invention.

DETAILED DESCRIPTION OF THE INVENTION

The process for the production of a synthesis gas and/or hydrogen by the partial oxidation in a membrane wall gasification reactor of a feedstream comprising the heavy residue bottoms consisting of a solid heterogeneous catalyst recovered from a slurry hydrocracking process will be described with reference to the drawing.

In general, the integrated process and apparatus for gasification of a feedstream comprising the heavy residue bottoms and solid catalyst from a slurry hydrocracking process includes a slurry hydro cracking zone in which a heavy hydrocarbon feedstock is converted to light fractions, a separation zone in which slurry hydrocracking zone effluent is separated into converted products and heavy residue bottoms, a membrane wall gasification reactor in which the heavy residue bottoms are partially oxidized to produce hydrogen and carbon monoxide as a hot raw synthesis gas and a slag material, a steam-generating heat exchanger to cool the hot raw synthesis gas, and a turbine to produce electricity from the steam generated.

In accordance with one or more additional embodiments, a process and apparatus for gasification of the slurry hydrocracking process heavy residue bottoms and solid catalyst further includes a water-gas shift reaction vessel to convert carbon monoxide to hydrogen through the water-gas shift reaction represented by $CO+H_2O \rightarrow CO_2+H_2$, to thereby increase the volume of hydrogen in the shifted synthesis gas.

A heavy residue bottoms gasification apparatus 10 includes a slurry hydrocracking zone 20, a separation zone 30, a membrane wall gasification reactor 40, a heat exchanger 50, a turbine 60 and a water-gas shift reaction vessel 70. Note that while the embodiment of apparatus 10 described herein includes a water-gas shift reaction vessel to enhance the output of hydrogen by conversion of some or all of the carbon monoxide in the synthesis gas, alternative embodiments similar to apparatus 10 can be practiced without the water-gas shift reaction vessel.

Slurry hydrocracking zone 20 includes an inlet 18 in fluid communication with a conduit 14 for receiving heavy hydrocarbon feedstock, a conduit 12 for introducing a stream of pressurized hydrogen or a hydrogen-containing gas, and a conduit 16 for introducing a solid heterogeneous catalyst into zone 20. Slurry hydrocracking zone 20 also includes an outlet 22 for discharging slurry hydrocracking zone effluent.

Separation zone 30 includes an inlet 24 in fluid communication with outlet 22 of the slurry hydrocracking zone 20, an outlet 26 for discharging converted products and an outlet 28 for discharging the remaining slurry of solid catalyst and heavy residue bottoms.

Membrane wall gasification reactor 40 includes an inlet 32 in fluid communication with outlet 28 of the separation zone 30, a conduit 36 for introducing a controlled amount of a pressurized stream of oxygen or an oxygen-containing gas, and a conduit 38 for introducing a controlled amount of steam. Membrane wall gasification reactor 40 also includes an outlet 42 for discharging hot raw synthesis gas and an outlet 34 for discharging slag material.

Heat exchanger 50 includes an inlet 44 in fluid communication with outlet 42 of the membrane wall gasification reactor 40, an outlet 46 for discharging steam, and an outlet 48 for discharging cooled synthesis gas. Outlet 46 is in fluid communication with a three-way control valve 52 to withdraw steam via a conduit 54 and/or to convey steam to the turbine 60. Outlet 48 is in fluid communication with another three-way control valve 62 to withdraw cooled synthesis gas via a conduit 64 and/or, optionally, to convey cooled synthesis gas to the water-gas shift reaction vessel 70.

Turbine 60 includes an inlet 56 in fluid communication with the three-way control valve 52 and an electrical conductor 58 for transmitting the electricity generated.

The optional water-gas shift reaction vessel 70 includes an inlet 68 in fluid communication with the three-way control valve 62 for receiving cooled synthesis gas and a conduit 66 for introducing a controlled amount of steam, and an outlet 72 for discharging the hydrogen rich shifted synthesis gas product. In certain embodiments, outlet 72 is in fluid communication with conduit 12 via a conduit 74 to return a portion of the hydrogen to the slurry hydrocracking zone 20.

In the practice of the method of the invention, a heavy hydrocarbon feed is introduced as a pressurized feedstream via conduit 14 with a predetermined amount of hydrogen or a hydrogen-containing gas via conduit 12 and solid heterogeneous catalyst via conduit 16 into inlet 18 of the slurry hydrocracking zone 20. The heavy hydrocarbon feed is thermally cracked in the slurry hydrocracking zone 20 to produce light hydrocarbons, such as naphtha and diesel.

The slurry hydrocracking zone effluent is discharged via outlet 22 and passed to inlet 24 of the separation zone 30 in which the effluent is separated into converted product discharged via outlet 26 and the heavy residue bottoms containing the solid catalyst is discharged via outlet 28.

The slurry hydrocracking heavy residue is optionally introduced into storage vessel 35 where it can be accumulated over time, if necessary, to assure a continuous feedstream for the gasification reactor, or for mixing as recycle with fresh feed to form the slurry.

In certain embodiments, at least a portion of the solid heterogeneous catalyst contained in the slurry hydrocracking heavy residue is optionally recycled back to the slurry hydrocracking zone 20 after the catalyst separation step (not shown in the figure).

A flowable slurry of the heavy residue bottoms and solid catalyst is introduced as a pressurized feedstock via inlet 32 into the membrane wall gasification reactor 40 along with a predetermined amount of oxygen or an oxygen-containing gas via conduit 36 and a predetermined amount of steam via conduit 38. The heavy residue bottoms containing the solid catalyst are partially oxidized in the membrane wall gasification reactor 40 to produce hydrogen, carbon monoxide and a slag material.

As will be understood by those of ordinary skill in the art, the viscosity and therefore the pumpability of the mixture of the heavy bottoms and solid catalyst mixture from the separator can be affected by various factors, including the nature of the original feedstream, the extent of recycled materials present and the physical characteristics of the catalyst(s) used in the slurry hydrocracking process. If the physical state of the heavy bottoms and catalyst mixture is solid to viscous, or a semi-solid liquid, it can be heated to a temperature and/or the pressure raised to render it sufficiently fluid to be pumped. The temperature can range from 25° C. to 200° C. and the pressure from one bar to 100 bars.

The slurry can be introduced into the gasifier reactor alone, or as a suspension using a carrier fluid, such as air, nitrogen, carbon dioxide, carbon monoxide, syngas, hydrogen, steam, nitrogen-free gas, low-oxygen gas, oxygen-free gas, and/or a combination of these carrier fluids. In addition, intermediate refinery streams such as cycle oils from an FCC process can be used as a carrier fluid for the mixture of heavy bottoms and catalyst material.

In another embodiment where the mixture is a solid at ambient temperature, it can be dried and pulverized by an appropriate milling or crushing apparatus, such as one or a series of ball mills, to produce a flowable solid. It can then be introduced into the gasifier using a conventional solid feed apparatus or with a carrier fluid. In a further embodiment where the slurry hydrocracking zone 20 is remote from the gasification reactor 40, e.g., in another facility, heavy residue bottoms collected in the storage vessel 35 can be dried to pellets by standard methods for easy handling.

Hydrogen and carbon monoxide are discharged from outlet 42 of the membrane wall gasification reactor 40 as hot raw synthesis gas and passed to inlet 44 of the heat exchanger 50 to cool the hot raw synthesis gas. The slag material, which is the final waste product resulting from the formation of ash from the solid catalyst and its condensation on the membrane walls of gasification reactor 40, are discharged via outlet 34. The slag material is optionally recycled via line 34 to the slurry hydrocracking zone 20 to minimize the usage of fresh catalyst after specific material quality treatments such as removal of dust, grinding and sulfiding. The slag material is also optionally recycled back to the gasification reactor 40 (not shown) to increase the content of solid ash-forming materials. This is especially beneficial when the minimum requirement for solid materials in the gasification reactor 40 is not provided by the heavy residue bottoms recovered from the separation zone 30.

Cooled synthesis gas is discharged via outlet 48 and can be withdrawn via the three-way control valve 62 and conduit 64 for use in other downstream processes. Steam discharged from outlet 46 of the heat exchanger 50 can be withdrawn via the three-way control valve 52 and conduit 54 and/or passed to inlet 56 of turbine 60 to produce electricity that is transmitted via conductor outlet 58.

In certain embodiments, at least a portion of the cooled synthesis gas is conveyed to inlet 68 of the water-gas shift reaction vessel 70 with steam introduced via conduit 66. Steam for the water-gas shift reaction can be provided by conduit 54 from the steam-generating heat exchanger 50. Carbon monoxide is converted to hydrogen in the presence of steam through the water-gas shift reaction represented by $CO+H_2O \rightarrow CO_2+H_2$. The content of carbon monoxide is reduced to less than 1 mole % after the water-gas shift reaction. A mixture of hydrogen, carbon dioxide, unreacted carbon monoxide and other impurities is discharged via outlet 72 as shifted synthesis gas. High purity hydrogen gas is optionally recovered by a process such as pressure swing adsorption (PSA), or by use of membranes, absorption, adsorption, or a combination thereof.

The feedstocks for the slurry hydrocracking process described herein are heavy hydrocarbon feedstocks derived from natural sources including crude oil, bitumen, tar sands and shale oils, or from refinery processes including atmospheric or vacuum residue, or products from coking, visbreaker and fluid catalytic cracking operations. The heavy hydrocarbon feedstock has boiling point in the range of about 400° C. to about 2000° C.

The slurry hydrocracking zone consists of one or more plug-flow type tubular reactors operating in the up or down flow modes. In general, the operating conditions for the slurry hydrocracking zone include: a temperature in the range of from 350° C. to 650° C., in certain embodiments 425° C. to 540° C., in other embodiments 450° C. to 510° C., and in further embodiments 470° C. to 500° C.; a hydrogen partial pressure in the range of from 20 bars to 200 bars, in certain embodiments 40 bars to 180 bars, and in further embodiments 60 bars to 150 bars; a liquid hourly space velocity of about 0.1 $h^{-1}$ to about 10 $h^{-1}$, in certain embodiments 0.1 $h^{-1}$ to about 4 $h^{-1}$, and in further embodiments 0.1 $h^{-1}$ to about 2 $h^{-1}$; a hydrogen feed rate of up to about 3000 liters of hydrogen (normalized) per liter of oil (L/L), in certain embodiments 500 L/L to 2000 L/L, and in further embodiments 500 L/L to 1000 L/L.

The solid heterogeneous catalyst used in the slurry hydrocracking zone can include one or more catalytically active metal components selected from Groups VIB, VB, VIB, VIIB, or VIII of the Periodic Table, such as iron, nickel, molybdenum, vanadium, tungsten, cobalt, ruthenium, and mixture thereof. The catalytically active metal may be present as a solid particle in elemental form or as a metal compound. Solid particle can be produced from nanoaggregates of the metal or metal compounds, or from a catalyst precursor such as a metal sulfate.

Catalyst precursor decomposes or reacts in the slurry hydrocracking zone or in a pretreatment step (not shown) to form the desired, well-dispersed and catalytically active solid particle. Precursors can also include oil-soluble organometallic compounds containing the catalytically active metal that thermally decomposes to form a solid particle having catalytic activity. Other suitable precursors include metal oxides that can be converted to catalytically active metal sulfides. In a particular embodiment, a metal oxide containing a mineral can be used as a precursor on an inorganic refractory metal oxide support. For example, bauxite is a particular precursor in which conversion of iron oxide crystals contained in this mineral provides an iron sulfide catalyst as a solid particle, where the iron sulfide after conversion is supported on the alumina that is predominantly present in the bauxite precursor.

In general, the operating conditions for the membrane wall gasification reactor include a temperature in the range of from 1200° C. to 1800° C.; a pressure in the range of from 30 bars to 100 bars; a mole ratio of oxygen-to-carbon content of the feedstock in the range of from 1:1 to 5:1; a mole ratio of steam-to-carbon content of the feedstock in the range of from 0.1:1 to 10:1.

The properties of the synthesis gas subjected to the water-gas shift reaction are a temperature in the range of from 150° C. to 400° C.; a pressure in the range of from 1 bar to 60 bars; and a mole ratio of water-to-carbon monoxide in the range of from 5:1 to 3:1.

Distinct advantages are offered by the apparatus and processes described herein when compared to other disposal methods for heavy residue bottoms and spent catalysts containing sulfur, nitrogen and/or organo-metal compounds that are recovered from a slurry hydrocracking process. Valuable synthesis gas and/or hydrogen gas, process steam and electricity can be efficiently produced for on-site refinery use. The integrated process of the invention can be practiced to particular advantage when hydrogen is needed for hydroprocessing and natural gas is not available. This is usually the case in refineries when full conversion is required to meet the demand for cleaner and lighter products, such as gasoline, jet fuel, and diesel transportation fuels.

EXAMPLE

A 100 kg sample of vacuum residue boiling above 520° C. derived from Arab heavy crude oil was introduced as a pressurized feedstock into a slurry hydrocracking zone. The vacuum residue had an API gravity of 5.7 degrees and contained 5.3 W % of sulfur, 0.45 W % of nitrogen, 19.5 W % of $C_7$-asphaltenes, 22.9 W % of CCR and 222 ppmw combined of nickel and vanadium. The slurry hydrocracking zone was operated at 420° C., 160 bars and liquid hourly space velocity of 0.5 $h^{-1}$. The catalyst was molybdenum sulfide on a solid support. The slurry hydrocracking conversion of vacuum residue was 85 W % and the resultant process yields are summarized in Table 1 below. The total hydrogen consumption was 1.6 W % of the feedstock processes.

TABLE 1

Slurry Hydrocracking Yields

| Product | Boiling Point | Yields W % |
|---|---|---|
| Light Gases | $C_1$-$C_4$ + $H_2S$ | 8.7 |
| Naphtha | $C_5$-170° C. | 0.9 |
| Gas oil | 170-350° C. | 26.2 |
| Vacuum Gas oil | 350-520° C. | 30.5 |
| Pitch | >520° C. | 35.3 |
| Total | | 101.6 |

After the separation of converted products, the heavy residue and spent catalyst were conveyed to a membrane wall gasification reactor. The gasification reactor was operated at 1045° C. and 28 bars. The ratio of steam-to-carbon was 0.6:1 by weight. The ratio of oxygen-to-carbon was 1:1 by weight. Heavy residue bottoms were partially oxidized to produce hydrogen, carbon monoxide and a slag material. Hydrogen and carbon monoxide were recovered as a hot raw synthesis gas and passed to a heat exchanger. The cooled raw synthesis gas was sent to a water-gas shift reaction vessel to increase the hydrogen yield. The water-gas shift reaction was conducted at 318° C. and 1 bar. The mole ratio of steam-to-carbon monoxide is 3:1.

The product yields are summarized in Table 2. As can be seen from a comparison of the data from Tables 1 and 2, 100 Kg of vacuum residue produced 8.7 Kg of light gases, 57.6 Kg of distillates (naphtha, gas oil and vacuum gas oil) and 35.3 Kg of pitch, from which 9.6 kg of hydrogen gas was produced from gasification.

TABLE 2

Gasification Yields

| Stream | Heavy Residue Bottoms (via outlet 28) Kg | Oxygen (via conduit 36) Kg | Steam (via conduit 38) Kg | Raw Synthesis Gas (via outlet 42 and inlet 68) Kg | Steam (via conduit 66) Kg | Shifted Synthesis Gas (via outlet 72) Kg |
|---|---|---|---|---|---|---|
| Total Pitch (containing ash) | 35.0 | | | | | |
| Pitch (containing hydrocarbons) | 34.0 | | | | | |
| Oxygen | | 35.0 | | | | |
| $H_2$/CO | | | | | | |
| $CH_4$ | | | | 0.2 | | 0.2 |
| $H_2$ | | | | 5.6 | | 9.6 |
| CO | | | | 58.9 | | 2.9 |

TABLE 2-continued

Gasification Yields

| Stream | Heavy Residue Bottoms (via outlet 28) Kg | Oxygen (via conduit 36) Kg | Steam (via conduit 38) Kg | Raw Synthesis Gas (via outlet 42 and inlet 68) Kg | Steam (via conduit 66) Kg | Shifted Synthesis Gas (via outlet 72) Kg |
|---|---|---|---|---|---|---|
| $CO_2$ | | | | 12.6 | | 100.6 |
| $H_2O$ | | | 17.6 | 7.9 | 51.7 | 23.5 |
| $H_2S$ | | | | 0.7 | | 0.7 |
| COS | | | | 0.1 | | 0.1 |
| $N_2$ | | | | 0.5 | | 0.5 |
| Ar | | | | 0 | | 0 |
| $NH_3$ | | | | 0 | | 0 |
| Total | 35.0 | 35.0 | 17.6 | 86.6 | 51.7 | 138.3 |
| Material Balance Total | | | | 98.9 | | |
| MB Oxygen | | | | 98.6 | | |

The method and system of the present invention have been described above and in the attached drawing; however, modifications derived from this description will be apparent to those of ordinary skill in the art and the scope of protection for the invention is to be determined by the claims that follow.

The invention claimed is:

1. An integrated process for the gasification of heavy residue bottoms recovered from a slurry hydrocracking process to produce synthesis gas, the bottoms containing spent solid heterogeneous catalyst particles, the process comprising:
   a. introducing a heavy hydrocarbon feedstock into a slurry hydrocracking zone with a predetermined amount of hydrogen based on the carbon content of the feedstock and solid heterogeneous catalyst to produce a slurry hydrocracking zone effluent;
   b. conveying the slurry hydrocracking zone effluent to a separation zone to separate the slurry hydrocracking zone effluent into converted products and heavy residue bottoms containing spent catalyst;
   c. recovering the converted products;
   d. preparing a flowable slurry of the heavy residue bottoms and spent catalyst;
   e. passing the slurry of heavy residue bottoms and spent catalyst as a pressurized feed into a membrane wall gasification reactor with a predetermined amount of oxygen and steam based on the carbon content of the feed;
   f. subjecting the heavy residue bottoms to partial oxidation to produce hydrogen, carbon monoxide and a slag material;
   g. recovering the hydrogen and carbon monoxide from the reactor in the form of a hot raw synthesis gas;
   h. passing the hot raw synthesis gas to a steam generating heat exchanger to cool the hot raw synthesis gas and produce steam;
   i. recovering steam from the heat exchanger and introducing the steam into a turbine to produce electricity;
   j. recovering the cooled synthesis gas; and
   k. recovering excess slag material from the membrane wall gasification reactor and recycling the recovered material to the inlet of the membrane wall gasification reactor to increase the content of solid ash-forming materials in the membrane wall gasification reactor feedstock.

2. The process of claim 1, wherein the carrier fluid for the mixture of heavy bottoms and spent catalyst material is cycle oil from an FCC process.

3. The process of claim 2, wherein the mixture is at a temperature range from 25° C. to 200° C.

4. The process of claim 2, wherein the mixture is at a pressure from 1 bar to 100 bar.

5. The process of claim 1, wherein the mixture of heavy bottoms and catalyst material is solid at ambient temperature.

6. The process of claim 5, wherein the solid mixture is dried and pulverized.

7. The process of claim 6, wherein the pulverized mixture is introduced into the gasifier using a solid feed apparatus or a carrier fluid.

8. An integrated process for the gasification of heavy residue bottoms recovered from a slurry hydrocracking process to produce synthesis gas, the bottoms containing spent solid heterogeneous catalyst particles, the process comprising:
   a. introducing a heavy hydrocarbon feedstock into a slurry hydrocracking zone with a predetermined amount of hydrogen based on the carbon content of the feedstock and solid heterogeneous catalyst to produce a slurry hydrocracking zone effluent;
   b. conveying the slurry hydrocracking zone effluent to a separation zone to separate the slurry hydrocracking zone effluent into converted products and heavy residue bottoms containing spent catalyst;
   c. recovering the converted products;
   d. preparing a flowable slurry of the heavy residue bottoms and spent catalyst;
   e. passing the slurry of heavy residue bottoms and spent catalyst as a pressurized feed into a membrane wall gasification reactor with a predetermined amount of oxygen and steam based on the carbon content of the feed;
   f. subjecting the heavy residue bottoms to partial oxidation to produce hydrogen, carbon monoxide and a slag material;
   g. recovering the hydrogen and carbon monoxide from the reactor in the form of a hot raw synthesis gas;
   h. passing the hot raw synthesis gas to a steam generating heat exchanger to cool the hot raw synthesis gas and produce steam;
   i. recovering steam from the heat exchanger and introducing the steam into a turbine to produce electricity;
   j. recovering the cooled synthesis gas; and
   k. recovering excess slag material from the membrane wall gasification reactor and introducing it into the slurry hydrocracking zone to minimize the usage of fresh solid heterogeneous catalyst.

9. The process of claim 8, wherein the recovered slag material is treated by grinding the slag material.

10. The process of claim 9, wherein the recovered slag material is treated by the removal of dust from the ground material.

11. The process of claim 9, wherein the recovered slag material is treated by sulfiding the ground slag material.

12. The process of claim 8, wherein the carrier fluid for the mixture of heavy bottoms and spent catalyst material is cycle oil from an FCC process.

13. The process of claim 12, wherein the mixture is at a temperature range from 25° C. to 200° C.

14. The process of claim 12, wherein the mixture is at a pressure from 1 bar to 100 bar.

15. The process of claim 8, wherein the mixture of heavy bottoms and spent catalyst material is solid at ambient temperature.

16. The process of claim 15, wherein the solid mixture is dried and pulverized.

17. The process of claim 16, wherein the pulverized mixture is introduced into the slurry hydrocracking zone using a solid feed apparatus or a carrier fluid.

\* \* \* \* \*